Dec. 3, 1968 D. C. NUGENT ET AL 3,414,540
METHODS OF MAKING ORGANOPOLYSILOXANE FLAKES
Filed May 11, 1967 2 Sheets-Sheet 2
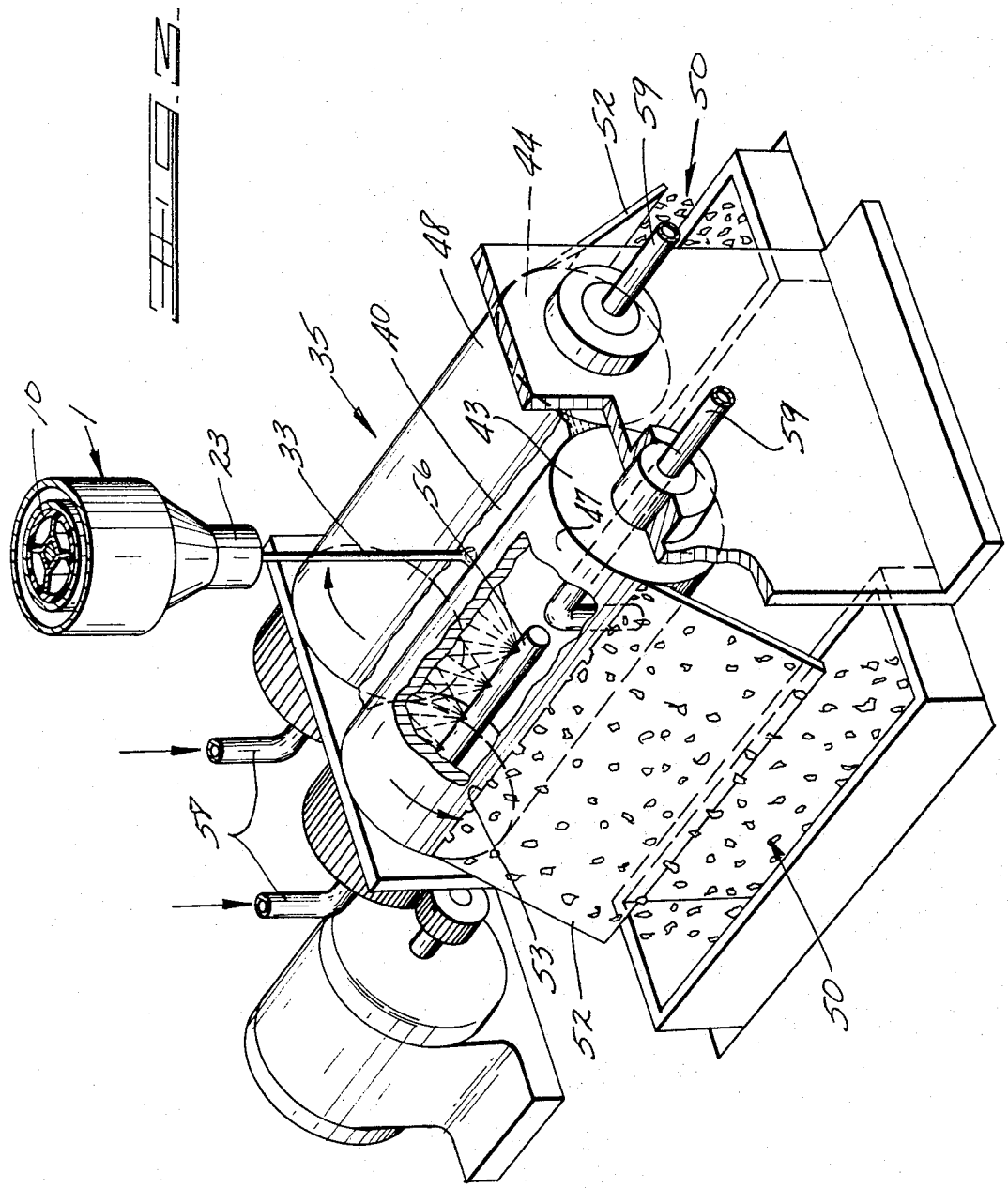
INVENTORS
DUANE C. NUGENT
DALE C. WOODWARD
W. A. Schaich
Richard D. Heberling
ATTORNEYS United States Patent Office 3,414,540
Patented Dec. 3, 1968

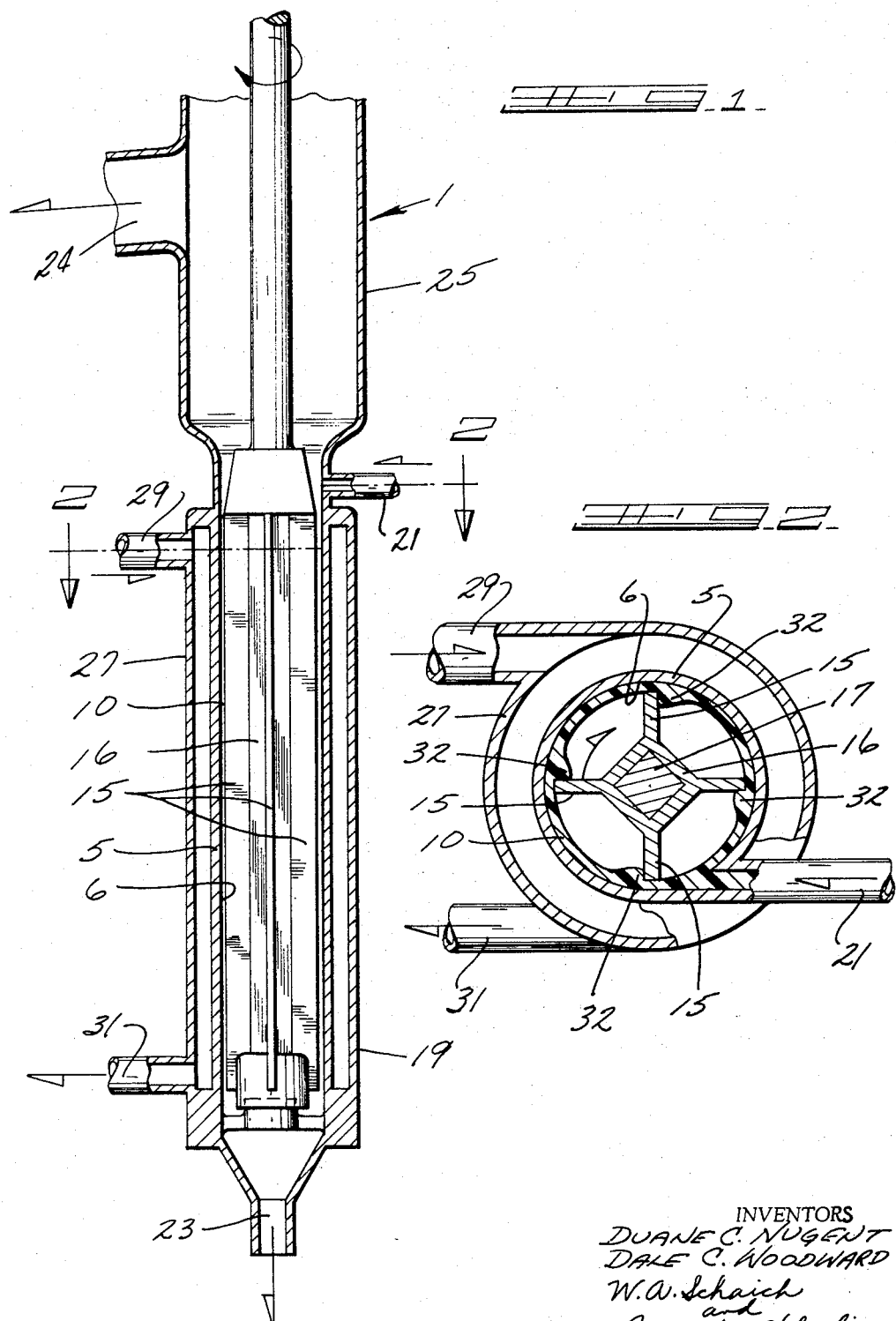

3,414,540
METHODS OF MAKING ORGANOPOLY-
SILOXANE FLAKES
Duane C. Nugent, Perrysburg, and Dale C. Woodward,
Sylvania, Ohio, assignors to Owens-Illinois, Inc., a corporation of Ohio
Filed May 11, 1967, Ser. No. 637,662
11 Claims. (Cl. 260—46.5)

ABSTRACT OF THE DISCLOSURE

Methods of reproducibly making solid gel-free flakes of solvent-soluble organopolysiloxane precured polymers, the flakes having a melting point of about 50° C. to 65° C., being tack free at room temperature, and being substantially free from gel. The flakes are easily dissolved in solvents such as butanol and acetone for coating, laminating and molding applications.

The present invention relates to methods of reproducibly making flakes of solvent-soluble, further curable, organopolysiloxane precured polymers, the flakes being easily handled in a dust-free form, and being readily soluble in solvents such as butanol and acetone. The precured polymers are made from trifunctional alkyl or aryl trialkoxysilanes, water and an acid catalyst, that are hydrolyzed and condensed to form liquid prepolymers. A liquid film of the prepolymer having a viscosity equivalent to that of about 30 to 310 centipoises at 60% solids at 25° C. in ethanol is formed and heated preferably in a wiped film evaporator for a time sufficient to obtain a solvent-soluble precured polymer that is substantially free from gel. The liquid precured polymer so heated in the wiped film evaporator is solidified within a time of less than about 3 minutes to retard further polymerization and to form a solid sheet that is broken up to form flakes that are solid, tack free at room temperature and substantially free from gel.

In the past, it has been difficult to reproducibly make solid solvent-soluble organopolysiloxane precured polymers that will easily and quickly dissolve in solvents and are otherwise easily handled in solid forms that are tack free at room temperature and free from gel.

The present invention provides a reproducible and economical method of making a solid stable organopolysiloxane precured polymer in a flaked form that is free of dust, easily stored and handled, and readily dissolved in suitable solvents such as ethanol, propanol, butanol and acetone for coating, molding and laminating applications.

The melting point of the flakes should be at least about 50° C. and preferably about 55 to 60° C. When the melting point gets above about 64 to 65° C., gel problems are often encountered.

Accordingly, it is an object of the present invention to provide methods of reproducibly making a solid, easily handled flake form of organopolysiloxane precured polymers that are derived from trifunctional alkyl or aryl trialkoxysilane monomers.

It is an object of the present invention to provide methods of reproducibly making a solid, easily handled flake form of organopolysiloxane precured polymers, the methods including precuring an organopolysiloxane prepolymer derived from trifunctional alkyl or alkoxy silane monomers by forming a liquid film thereof having a certain viscosity, heating the film under certain conditions of time and temperature, thereafter solidifying the precured polymer within a time period of less than about 3 minutes and breaking the solidified polymer into flakes that are tack free at room temperature and substantially free from gel.

These and other objects will become apparent from the specification that follows, the appended claims and the drawings, in which:

FIGURE 1 is a fragmentary front elevational view partly in section of a wiped film evaporator used to form a liquid film of an organopolysiloxane prepolymer and to heat the film to remove solvent thereof and promote further polymerization;

FIGURE 2 is a fragmentary sectional view taken on the line 2—2 of FIGURE 1 and on a larger scale than FIGURE 1; and FIGURE 3 is a fragmentary perspective view of a drum flaking unit for solidifying and flaking the liquid product of the wiped film evaporator of FIGURE 1.

The present invention provides a method of preparing a solvent-soluble further curable organic partial condensation product organopolysiloxane precured polymer prepared from the reaction of (1) A silane of the group consisting of a methyltrialkoxysilane, ethyltrialkoxysilane, phenyltrialkoxysilane and mixtures thereof in which the alkoxy group contains 1 to 6 carbon atoms,
(2) At least about 1.5 moles of water for every mole of total silane present,
(3) At least a trace of acid, at a temperature of about 50° C. to 160° C. for about 1 to 10 hours to form an organopolysiloxane prepolymer,
(4) Further heating to strip off alcohol and water, and
(5) Still further heating the prepolymer to provide the same with heat history at a temperature preferably of from about 65° to 85° C. for a period of time preferably of about 10 to 25 hours until a viscosity of about 30 to 310 centipoises at 60% solids at 25° C. in ethanol is reached, the lower viscosity values corresponding to the methyltrialkoxysilane prepolymer, the method comprising the steps of:
  (A) Forming a liquid film of the prepolymer having a viscosity equivalent to that of about 30 to 310 centipoises at 60% solids at 25° C. in ethanol;
  (B) Heating the film at a temperature of about 140 to 180° C. or more for a time sufficient to obtain a solvent-soluble precured polymer that is substantially free from gel;
  (C) Cooling the precured polymer to form a solid sheet within a time of less than about 3 minutes to form a solid sheet and retard further polymerization of the polymer; and
  (D) Flaking the solidified polymer from Step C to break up the solid sheet into flakes that have a melting point of about 50 to 65° C., are tack free at room temperature and are substantially free from gel.

The above-described method of preparing a solid or liquid solvent-soluble further curable organopolysiloxane precured polymer is preferably carried out by introducing a prepolymer feed into a wiped film evaporator 1 having a chamber wall 5 with an inner surface 6 thereof. As indicated above, a liquid film 10 of the feed is formed from the prepolymer generally having a viscosity equivalent to that of about 30 to 310 centipoises at 60% solids at 25° C. in ethanol and the film 10 is heated as it flows down the chamber wall 5 at a film temperature of about 140° C. to 180° C. or more to evaporate solvent and to increase the viscosity of the prepolymer and apparently further polymerize the same to provide a liquid precured polymer that is free from gel and solidifying the polymer within not more than about 3 minutes preferably by forming a pool of the polymer in the nip between two cooled rolls rotating in opposite directions and so as to carry the polymer from the pool upwardly over each of the rolls to form two separate solid sheets of precured polymer and thereafter removing and breaking the sheets by suitable means such as doctor knives mounted close to each of the rolls to thereby form flakes of the precured polymer.

As seen in the drawings, the film 10 in the evaporator is wiped by four blades 15 that project from an integral hollow central portion having a square cross sectional outline mounted on a square shaft 17 which is driven by means not shown to provide a wiping action on the film being precured. The blades 15 are equally spaced around the periphery of the shaft 17 and extend longitudinally nearly the entire length of the lower cylindrical portion 19 of the evaporator 1. The prepolymer is fed in through inlet 21 and the precured polymer leaves the evaporator through outlet 23. Solvent stripped off is removed through vapor exit 24 of an upper portion 25 of the evaporator. The concentric chamber 27 is provided around the lower portion 19 of the evaporator for heating the wall 5. The heating fluid, steam, is fed in through inlet 29 and it leaves through outlet 31.

As best seen in FIGURE 2, a wave 32 of liquid film 10 is built up ahead of each of the blades 15 and pushed thereby, the blade acting as a wiper blade to provide the solvent stripping, wiping and precuring action.

The liquid polymer, upon leaving outlet 23 of the wiped film evaporator in the form of a stream 33, enters a drum flaking unit 35 by falling into a molten pool 40 of precured polymer located in the nip between hollow roll 43 and hollow roll 44. The rolls 43 and 44 rotate in opposite directions and carry molten pool material upwardly and around the top of each roll to provide a solidified sheet 47 of polymer over roll 43 and a solidified sheet 48 of polymer over roll 44. Each of the sheets 47 and 48 are carried over their corresponding rolls until being removed and broken up into flakes 50 by a scraper or doctor knife 52 which is mounted near the outer periphery of the roll, the cutting edge 53 being in a plane approximately parallel to the horizontal axis of the roll and being generally horizontally aligned therewith. As seen in FIGURE 3, for instance, each of the rolls is cooled by suitable means such as a spray of water from water spray pipe 56, the water coming in through inlet pipe 58, being sprayed on the interior of each of the hollow rolls and leaving through outlet pipe 59. The cooling must be accomplished so that the liquid precured polymer is solidified within about 3 minutes and preferably 1 to 2 minutes to retard further polymerization of the polymer and yet provide solid gel-free flakes that have a melting point of about 50° to 65° C., and, thus are tack free at room temperature.

The solid sheet of precured polymer formed upwardly from the molten pool as the cold rolls turn up at their line of contact is generally about 0.025 to 0.045 inch and preferably about 0.030 to 0.035 inch in thickness. The chilled sheet of polymer is relatively brittle and although it adheres to the roll, it is easily removed therefrom by contact with the knives, the sheet shattering into flakes having an average area of approximately about 1/16 to 1 square inch and a thickness of about 0.02 to 0.05 inch.

The density of the flakes is greater than the density of a powdered material and hence, in large quantities, it is easier to place the flakes into solution, the flakes being wetted very easily by the solvent and sinking under the surface thereof while powder tends to float on the surface.

Suitable trifunctional silane starting materials to provide the precured polymers are methyltrialkoxysilanes, ethyltrialkoxysilanes, phenyltrialkoxysilanes, or mixtures thereof in which the alkoxy group has 1 to 6 carbon atoms, and preferably 2 carbon atoms.

The preferred trifunctional material is methyltrialkoxysilane or a mixture thereof with phenyltrialkoxysilane in which the alkoxy group is preferably ethoxy. It is preferred that the molar ratio of methyltrialkoxysilanes to phenyltrialkoxysilanes in a mixture of the two is about 2:1 although generally good results can be obtained using a ratio of about 1.5:1 to 2.5:1. A precured polymer for laminates and coatings and even flexible coatings can also be made with molar ratios of preferably about 1:3.5 to 1:4.5 and more preferably about 1:4.

In general, prepolymers to be precured and thereafter spray dried or otherwise converted to solvent-soluble liquids or solids that are free from gel and in the case of solids that are tack free at room temperature are prepared by:

(I) Heating a mixture of
  (A) A silane that is methyltrialkoxysilane, ethyltrialkoxysilane, phenyltrialkoxysilane, or mixtures of methyltrialkoxysilane and phenyltrialkoxysilane in which the alkoxy radical contains from 1 to 6 carbon atoms and preferably 2 to 3 carbon atoms; and
  (B) At least a trace of acid and at least about 1.5 moles of water for every mole of total silane present, at a temperature preferably of about 65° to 105° C. for a period of time of from about 1 to about 10 hours; and (II) Concentrating the liquid siloxane partial condensation product from Step I to remove some but not all volatile material including alkanol by-product and some water and to obtain a liquid residue having a viscosity equivalent to that of preferably about 20 to 65 centipoises at 60% solids at 25° C. in ethanol; and (III) Still further heating the prepolymer to provide the same with heat history at a temperature preferably of from about 65° to 85° C. for a period of time preferably of about 10 to 25 hours until a viscosity of about 30 to 310 centipoises at 60% solids at 25° C. in ethanol is reached, the lower viscosity values corresponding to the methyltrialkoxysilane prepolymer.

Thereafter the prepolymer product of Step III is precured at a temperature of from about slightly below, say 5° C., to as much as about 50° C. below the gel point of the resin for a period of time of from about 10 seconds to about 60 minutes, the 60 minutes requiring the lower temperatures. As previously indicated, the precuring is accomplished by forming a liquid film of the prepolymer product of Step III and heating the same at about 140° to 180° C. or more.

As used here, the gel point is that temperature at which a 50 gram sample of prepolymer gels when placed in a 100 ml. beaker and stirred on a 600° F. hot plate.

The mixture of methyl and phenyl precured polymers is preferably made by (I) Heating a mixture of
  (A) From about 1 to about 4 moles of methyltriethoxysilane and from about 5 to about 1 mole of phenyltriethoxysilane;
  (B) From about 1.5 to about 3, 4, or 5 moles of water for every mole of total silane present, there being less than 0.01 mole of acid present in the reaction mixture per mole of said silane introduced thereto at a temperature of about 80° C. for a period of time of from about 2 to about 6 hours;

thereafter, the mixture is further processed by (II) Concentrating the liquid siloxane partial condensation product from Step I by distilling at the reaction temperature until approximately 60–70% of the theoretical yield of ethanol is removed, thereby to remove some but not all volatile material including alkanol by-product and some water and to obtain a liquid residue that in the case of a methyl silane/phenyl silane ratio of about 2.5:1 to 1.5:1 has a viscosity of about 30 to 45 or 50 centipoises at 60% solids and 25° C. in ethanol or in the case of a methyl/phenyl ratio of about 1:3.5 to 1:4.5 has a viscosity of about 35 to 65 centipoises, (III) Further heating the product of Step II to provide the same with heat history at a temperature of from about 65° to 85° C. for a period of time of about 10 to 25 hours until a viscosity of about 50 to 65 centipoises at 60% solids is reached for the product with the methyl/phenyl ratio of about 2.5:1 to 1.5:1 and a viscosity of 150 to 310 is reached for the product having a methyl/phenyl ratio of about 1:3.5 to 1:4.5; and (IV) Precuring the prepolymer product of Step III by forming a thin film thereof by heating the film to a temperature of about 140° to 180° C., or more which is a temperature of from about slightly below the gel point to about 30° C. below the gel point of the resin and holding this temperature for a period of time of from 5 to 10 up to about 120 seconds.

Step IV above is accomplished by a heating of the liquid film of a prepolymer having a predetermined gel point of about 175° to 210° C. at about 170° to about 190° or 195°.

The precured polymer from the methyltrialkoxysilane is generally prepared by a method that includes the steps of (I) Heating a mixture of
(A) A methyltrialkoxysilane wherein the alkoxy radical contains less than 4 carbon atoms and from 0 to 5 mole percent, based on total silane reactant material, of at least one compound represented by the general formula

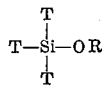

wherein R in the alkoxy radical —OR represents an alkyl radical having less than 4 carbon atoms such as methoxy and ethoxy, and each T independently represents an aryl, alkyl or alkenyl radical, each of which contains less than 7 carbon atoms, or the aforementioned alkoxy radical, —OR, and (B) From 1.5 to about 10 moles and preferably from 1.5 to about 3 moles of water per mole of total silane and water reactant material, said mixture containing by weight from 0 to 700 parts of acid, expressed as HCl, per million parts of total silane and water reactant material, said maximum of 700 parts of acid being the approximate upper limit when using a silane:water mole ratio of 1:1.5 and decreasing to a maximum of 1 weight part of acid, expressed as HCl, per million parts of total silane and water reactant material when the silane:water mole ratio employed is 1:10, the heating of the said mixture to form a liquid siloxane partial condensation product being continued for from 1 to 10 hours at temperatures of at least 50° C. while retaining in said mixture at least 1.5 moles of alkanol by-product per mole of silane starting material assuming complete hydrolysis of all alkoxy-silicon linkages in the liquid reaction mixture;

(II) Concentrating the liquid siloxane partial condensation product from Step I by gradually raising its temperature above its initial reaction temperature to a maximum temperature within the range of from about 65° to 300° C. and preferably about 80° to 85° C. thereby to remove some but not all volatile material including alkanol by-product and some water and to obtain a liquid residue having a viscosity equivalent to that of about 15 to 25 centipoises at 50% solids at 25° C. in ethanol (which is about 21 to 31 centipoises at 60% solids at 25° C. in ethanol);

(III) Further heating the product of Step II at a temperature of about 65° to 85° C. for about 10 to 25 hours until a viscosity of about 25 to 35 centipoises at 50% solids is reached which is the equivalent of about 31 to 41 centipoises at 60% solids at 25° C. in ethanol; and (IV) Precuring the concentrated liquid siloxane partial condensation prepolymer products from Step III by forming a liquid film thereof and heating it at a temperature of about 140° to 180° C. which is generally slightly below its gelation point to remove the remainder of the volatile material and to obtain, without gelation, a more highly condensed, organic solvent-soluble, siloxane partial condensation precured polymer product that is capable of being finally cured to a solid organopolysiloxane resin. The precured resin, as previously indicated, when solid is also tack free at room temperature and is substantially free from gel. When the precured polymer is liquid, it is also free from gel and capable of forming consistently good flexible coatings.

In preparing a general purpose precured polymer from a mixture of methyl and phenyltrialkoxysilanes in which the methyl/phenyl ratio is about 2.5:1 to 1.5:1, the liquid film is preferably one with an additional heat history having a viscosity equivalent to that of about 50 to 65 centipoises and optimally, 55 to 60 centipoises, at 60% solids at 25° C. in ethanol, and the heating of the film is preferably conducted at about 160° to 180° C., and optimally, about 165 to 175° C.

In the case of a general purpose prepolymer made from methyltrialkoxysilane such as the methyltriethoxysilane homopolymer, the film is formed from a material having additional heat history and preferably having a viscosity equivalent to that of about 25 to 35 centipoises, and optimally, 28 to 32 centipoises at 50% solids at 25° C. in ethanol, and the heating is preferably accomplished at about 150° to 170° C. with the best results being obtained at about 155 to 165° C.

It can be seen that one advantage of the present process over a process for producing polymer powder by spray drying is that the flaking process requires no solvent recovery systems.

The following examples are intended to illustrate the present invention and not to limit the same.

EXAMPLE 1

An organopolysiloxane prepolymer was prepared from methyltriethoxysilane and phenyltriethoxysilane, using 2 moles of the methyl silane and 1 mole of the phenyl silane. The mixture of methyl and phenyltriethoxysilanes was hydrolyzed and condensed with 9 moles of water and 2.5 parts of HCl per million parts of water and silane, the silanes first being purified by distillation to about zero p.p.m. of HCl.

The reaction mixture was heated with agitation in a flask equipped with a condenser until the pot temperature reached 80° C. This temperature was maintained for 4 hours. After about 20 minutes, the two-phase reaction mixture clarified to a one-phase system due to the ethanol liberated in the reaction acting as a mutual solvent. At the end of the 4-hour period, approximately 282 g. of an ethanol-water mixture (about 92% alcohol) was removed by distillation. The hydrolysis and condensation reaction and concentration thereafter produced a viscous liquid.

The viscous liquid, having a viscosity of about 40 centipoises at 60% solids at 25° C. in ethanol, was refluxed for 15 hours to provide the same with a heat history and a final viscosity of about 60 centipoises at 60% solids and 25° C.

The liquid was then precured in a wiped film evaporator operating at a 195–200° C. wall temperature to provide a liquid product temperature of about 170–175° C. for a mean residence time of less than 40 seconds, namely, 20 seconds. The resultant precured material was chilled and solidified in about 60 seconds by passing the liquid through a drum flaker unit such as unit 35 shown in the drawings. The liquid was solidified into sheets which were broken up into flakes which had a melting point of about 55° C. and were substantially free from gel.

The flakes were easily dissolved by n-butanol and excellent coatings, made therefrom. The n-butanol and other polar solvent solutions were used to prepare good laminates, the solutions being used to wet the cloth laminating.

The flakes were ground to about a 200 mesh size, blended with fillers, and the blends molded to provide good molded articles.

EXAMPLE 2

An organic partial condensation prepolymer product was prepared by hydrolyzing and condensing about 1 mole of methyltriethoxysilane with 2½ moles of water and 3 weight parts of HCl per million parts of water and silane, the silane first being purified by distillation to about zero p.p.m. of HCl.

The reaction mixture was heated with agitation in a flask equipped with a condenser until the pot temperature reached 80° C. This temperature was maintained for 4 hours. After about 20 minutes, the two-phase reaction mixture clarified to a one-phase system due to the ethanol liberated in the reaction acting as a mutual solvent. At the end of the 4-hour period, approximately 78 g. of an ethanol-water mixture (about 92% alcohol) was removed by distillation. The hydrolysis and condensation reaction and concentration thereafter produced a viscous liquid. The viscous liquid prepolymer was refluxed at 50% solids for 20 hours to increase the viscosity to 30 centipoises at 50% solids at 25° C. in ethanol.

The viscous liquid, having a viscosity of about 30 centipoises at 50% solids at 25° C. in ethanol, was further treated by forming a film thereof and heating the film in a wiped film evaporator. The evaporator was operated at a wall temperature of about 200° C. that provides a product temperature of about 160° C. The mean residence time was about 20 seconds.

The resultant liquid precured material was solidified in about 1 to 1½ minutes and broken up into flakes by a drum flaker unit as previously described.

Excellent molding and laminates were prepared from the flaked precured polymer. Also, good coatings were prepared by dissolving the flakes in n-butanol to provide a 40% by weight of solids solution. The solution was cast on an aluminum surface and cured at 200° C. for 2 minutes to provide a hard acetone-resistant coating.

EXAMPLE 3

A viscous organopolysiloxane prepolymer was prepared from 4 moles of phenyltriethoxysilane, 1 mole of methyltriethoxysilane, 20 moles of water, and 10 parts by weight of HCl per million parts by weight of water and silane, the silanes first being purified by distillation to approximately zero parts per million of HCl. The resultant hydrolysis and condensation reaction was carried out in generally the same manner as described in Example 1. A prepolymer having a viscosity of 45 centipoises at 25° C. at about 61 to 61.5% solids in ethanol was obtained. The prepolymer viscosity at 60% solids is slightly less, say about 44 centipoises.

The prepolymer was heated at reflux and given a heat history of 18 hours to thereby increase the viscosity to approximately 180 centipoises at 60% solids at 25° C. in ethanol. The wiped film evaporator then was used to strip the solvent and further polymerize the prepolymer, the product temperature being about 170° C. and the wall temperature of the evaporator being about 197° C. The mean residence time was less than 1 minute, about 30 seconds. The polymer was solidified in about 2 minutes and flaked as previously described in the drum flaker unit. As described in the previous examples, coatings laminates and moldings were made from the above-described flaked precured polymer.

In the above Example 3, the viscosity of the prepolymer fed into the wiped film evaporator can vary from about 150 to 310 centipoises at 60% solids at 25° C. in ethanol. In general, such a material is prepared by a 15 or 16 up to a 19 or 20 hour heat history reflux on a starting prepolymer of about 40 to 41 up to 48 or 49 centipoises at 60% solids. In order to obtain a precured polymer that is tack free at room temperature and free from gel, the product temperature in the wiped film evaporator can be about 160 to 180° C. or more and the wall temperature of the evaporator can be at about 195 to 200° C. The mean residence time should be less than about 1 minute and is preferably about 15 to 30 seconds.

The liquid film in all the examples that is heated preferably from about 140° C. to 170 or 180° C. is generally about ½ to 10 or 15 mils in thickness.

It will be understood that, in accordance with the provisions of the patent statutes, modifications and variations of the present invention may be made without departing from the spirit and scope thereof.

What is claimed is:

1. A method of preparing a solvent-soluble further curable organic partial condensation product organopolysiloxane precured polymer in flaked form prepared from the reaction of
    (1) a silane of the group consisting of a methyltrialkoxysilane, ethyltrialkoxysilane, phenyltrialkoxysilane and mixtures thereof in which the alkoxy group contains 1 to 6 carbon atoms,
    (2) at least about 1.5 moles of water for every mole of total silane present, and
    (3) at least a trace of acid, at a temperature of about 50° C. to 160° C. for about 1 to 10 hours, the method comprising the steps of:
        (A) forming a liquid film of the prepolymer having a viscosity equivalent to that of about 30 to 310 centipoises at 60% solids at 25° C. in ethanol;
        (B) heating the film at a temperature of about 140 to 195° C. for a time sufficient to obtain a solvent-soluble precured polymer that is substantially free from gel;
        (C) solidifying by cooling the precured polymer within a time of less than about 3 minutes to retard further polymerization thereof; and
        (D) breaking up the solidified polymer from Step C in the form of flakes that are solid and tack free at room temperature and are substantially free from gel.

2. A method of preparing a solvent-soluble further curable organic partial condensation product organopolysiloxane precured polymer in flaked form prepared from the reaction of
    (1) a silane of the group consisting of a methyltrialkoxysilane, ethyltrialkoxysilane, phenyltrialkoxysilane and mixtures thereof in which the alkoxy group contains 1 to 6 carbon atoms,
    (2) at least about 1.5 moles of water for every mole of total silane present, and
    (3) at least a trace of acid, at a temperature of about 50° C. to 160° C. for about 1 to 10 hours, the method comprising the steps of:
        (A) forming a liquid film of the prepolymer having a viscosity equivalent to that of about 30 to 310 centipoises at 60% solids at 25° C. in ethanol;
        (B) heating the film at a temperature of about 140 to 180° C. for a time sufficient to obtain a solvent-soluble precured polymer that is substantially free from gel;
        (C) cooling the precured polymer to form a solid sheet within a time of less than about 3 minutes to form a solid sheet and retard further polymerization of the polymer; and
        (D) flaking the solidified polymer from Step C to break up the solid sheet into flakes that have a melting point of about 50 to 65° C., are tack free at room temperature and are substantially free from gel.

3. A method as defined in claim 1 in which the silane is methyltrialkoxysilane.

4. A method as defined in claim 1 in which the silane is a mixture of methyltrialkoxysilane and phenyltrialkoxysilane.

5. A method as defined in claim 1 in which the silane is methyltriethoxysilane.

6. A method as defined in claim 1 in which the silane is a mixture of methyltriethoxysilane and phenyltriethoxysilane.

7. A method as defined in claim 5 in which the viscosity of the prepolymer in Step A is about 31 to 41 centipoises and the temperature in Step B is about 150° to 170° C.

8. A method as defined in claim 7 in which the viscosity of the prepolymer is about 36 centipoises and the temperature in Step B is about 160° C.

9. A method as defined in claim 8 in which the time of solidifying in Step C is about two minutes.

10. A method as defined in claim 6 in which the viscosity in Step A is about 50 to 65 centipoises and the temperature in Step B is about 160° to 180° C.

11. A method as defined in claim 10 in which the time of solidifying in Step C is about two minutes.

References Cited

UNITED STATES PATENTS 3,354,095   11/1967   Burzynski et al. _____ 252—316

DONALD E. CZAJA, *Primary Examiner.*

M. I. MARQUIS, *Assistant Examiner.*

UNITED STATES PATENT OFFICE
CERTIFICATE OF CORRECTION

Patent No. 3,414,540

December 3, 1968

Duane C. Nugent et al.

It is certified that error appears in the above identified patent and that said Letters Patent are hereby corrected as shown below:

Column 7, line 28, "provides" should read -- provided --. Column 8, line 33, cancel "by cooling".

Signed and sealed this 10th day of March 1970.

(SEAL)
Attest:

Edward M. Fletcher, Jr.

Attesting Officer

WILLIAM E. SCHUYLER, JR.

Commissioner of Patents